Figure 1:
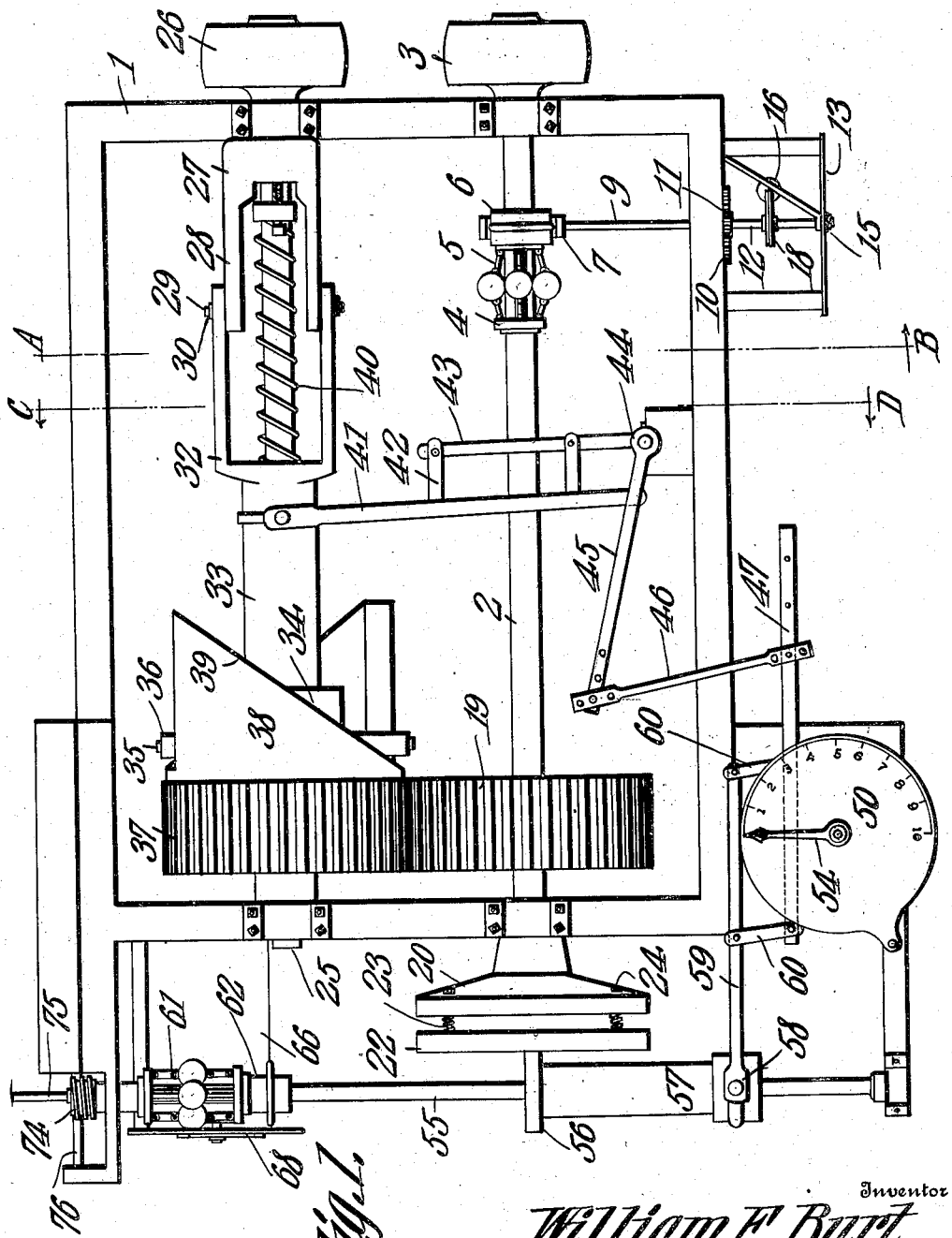

W. E. BURT.
METER FOR INDICATING HORSE POWER.
APPLICATION FILED OCT. 30, 1908.

942,130.

Patented Dec. 7, 1909.
3 SHEETS—SHEET 1.

Witnesses

Inventor
William E. Burt.
By C. A. Snow & Co.
Attorneys

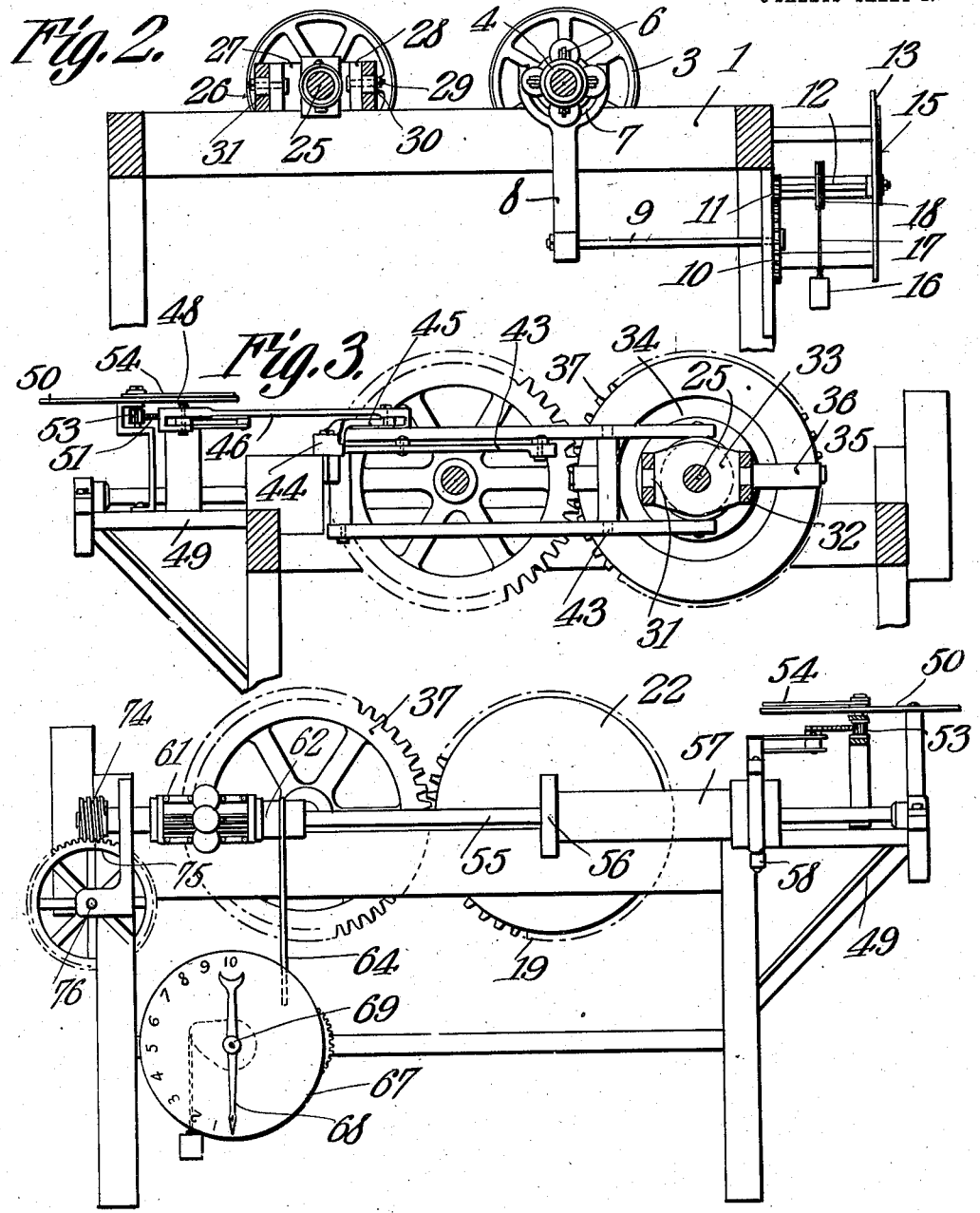

W. E. BURT.
METER FOR INDICATING HORSE POWER.
APPLICATION FILED OCT. 30, 1908.
942,130.
Patented Dec. 7, 1909.
3 SHEETS—SHEET 3.
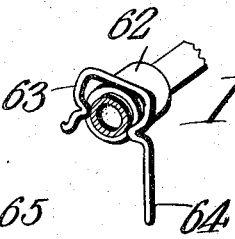
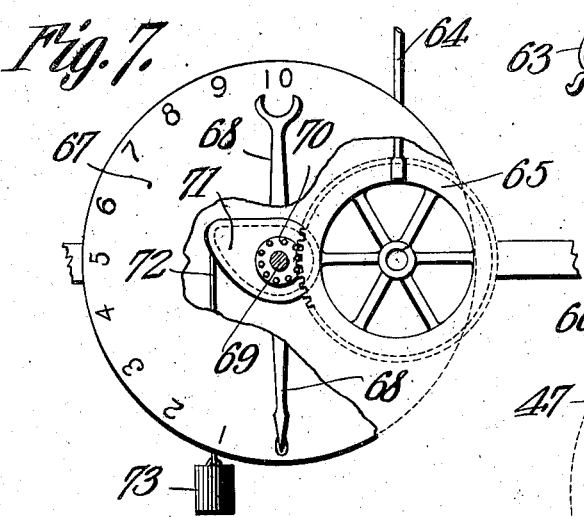
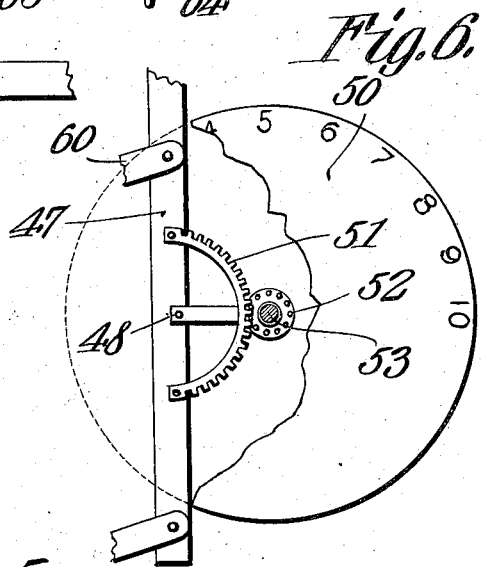
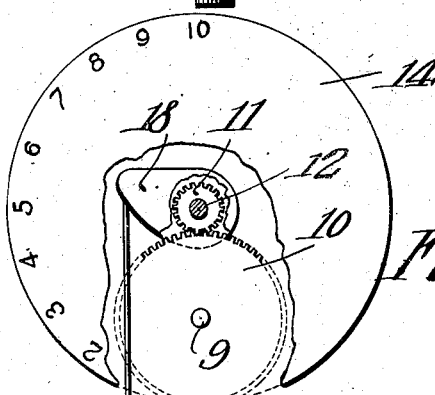
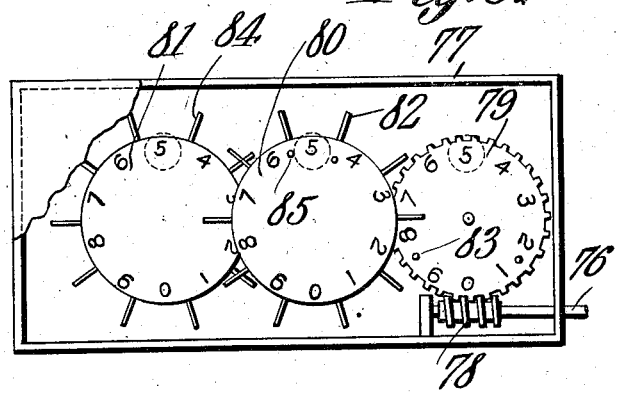
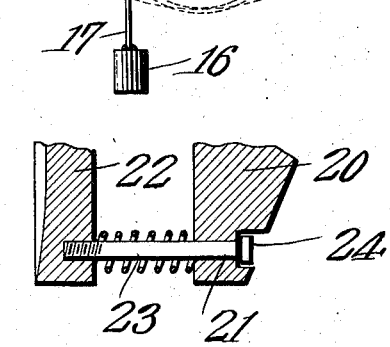
Witnesses
Inventor
William E. Burt.
By C. A. Snow & Co.
Attorneys

UNITED STATES PATENT OFFICE.

WILLIAM E. BURT, OF YUBA, WISCONSIN.

METER FOR INDICATING HORSE-POWER.

942,130.

Specification of Letters Patent.   Patented Dec. 7, 1909.

Application filed October 30, 1908.   Serial No. 460,356.

*To all whom it may concern:*

Be it known that I, WILLIAM E. BURT, a citizen of the United States, residing at Yuba, in the county of Richland and State of Wisconsin, have invented a new and useful Meter for Indicating Horse-Power, of which the following is a specification.

This invention relates to meters for indicating the horse power developed and consumed by a motor and its object is to provide mechanism whereby the speed of rotation and the torque developed can be accurately indicated, means being also provided for multiplying the speed by the torque to indicate the generated horse power.

Another object is to provide efficient means for accurately indicating the consumed horse power.

A still further object is to provide simple and efficient means for accurately indicating the torque developed by the machine.

A still further object is to provide a meter of this character which, after once being properly adjusted, remains practically unaffected by altitude and climatic conditions.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of the meter. Fig. 2 is a section on line A—B Fig. 1. Fig. 3 is a section on line C—D Fig. 1. Fig. 4 is an end elevation of the meter and showing that end thereof used for indicating developed horse power. Fig. 5 is a front elevation of the speed-indicating mechanism, the dial being partly broken away. Fig. 6 is a view similar to Fig. 5 and showing the torque indicator. Fig. 7 is an elevation of the indicator used for designating developed horse power, the dial of the indicator being partly broken away. Fig. 8 is an elevation of the indicator used for designating consumed horse power, the face of the indicator being broken away.
Fig. 9 is a detail view of a portion of the actuating mechanism of the indicator shown in Fig. 7. Fig. 10 is a section through a portion of the friction gearing.

Referring to the figures by characters of reference 1 designates the frame of the machine, and journaled upon this frame is driving mechanism including a main shaft 2 having a pulley 3 thereon designed to be driven by a belt extending from the motor to be tested. It is of course to be understood however that instead of providing a pulley, a sprocket wheel or any other suitable device may be utilized for the purpose of receiving power from the motor. This shaft 2 has a collar 4 thereon to which are connected the weighted straps 5 of a centrifugal governor, said straps being also attached to a slidable sleeve 6 mounted on the shaft 2 and loosely engaged by the forked end 7 of an arm 8 upstanding from one end of a rock bar 9 journaled in the front portion of the frame 1. This rock bar has a gear 10 secured to it, said gear meshing with a smaller gear 11 secured to a short shaft 12. Said shaft is journaled within an auxiliary frame 13 arranged upon the frame 1, there being a dial 14 upon said auxiliary frame and which is provided with numerals or other characters for indicating the number of feet per minute traveled by the driving belt designed to be mounted on the pulley 3. An index 15 is secured to the shaft 12 and rotates therewith, said index being designed to point to any one of the characters on the dial so as to indicate the speed of rotation.
In order that the index, rock-arm 9, and the governor may be automatically returned to their initial positions upon the stoppage of the meter, or when the speed of rotation diminishes, a weight 16 is provided, said weight being attached to a chain or other flexible device 17 attached to a cam-shaped member 18 which is secured to shaft 12, said member being provided with a grooved edge into which the chain or other flexible portion into which the chain or other flexible element 17 is designed to work as the shaft 12 partly rotates.

From the foregoing description it will be understood that the weights of the governor 5 will be thrown outwardly as the shaft 2 rotates, the amount of movement being in proportion to the speed of rotation of the shaft 2. It will be obvious therefore that the sleeve 6 will be shifted along shaft 2 and cause a corresponding movement of the rock-bar 9. Gear 10 will therefore partly rotate the gear 9 and shaft 12 against the action of the weight 16 and the index 15 will accurately indicate upon the dial the number of feet per minute traveled by the drive-belt designed to be mounted on the pulley 3. For example, should this pulley be five feet in circumference and make two hundred revolutions per minute, the distance traveled by the belt thereon would be one thousand feet per minute, and the mechanism operated by the shaft 2 would thus indicate upon the dial 14 the numeral 1, used for indicating one thousand feet per minute.

Shaft 2 is provided with a gear 19 and secured upon one end of the shaft is a circular head 20 having parallel guide arms 21 outstanding from one face thereof and close to the margin, said arms being slidably mounted within the head and secured at their outer ends to a disk 22, the outer face of which is concave as indicated particularly in Fig. 10. Springs 23 are arranged upon the arms 21 and bear at their ends against the disk 22 and the head 20, so as to hold the disk 22 normally spaced from the head. Means are provided upon arms 21 for limiting the movement of disk 22 away from the head 20, said means preferably consisting of heads 24 formed upon the ends of the arms.

A secondary shaft 25 is journaled upon the frame 1 and has a pulley 26 or other revoluble element secured thereto and designed to be connected to the load. This shaft has a head 27 secured to it and provided with parallel arms 28 spaced from but disposed adjacent opposite portions of the shaft 25, each of said arms having a trunnion 29 extending laterally therefrom and provided with a roller 30, or other suitable antifriction device. These rollers are mounted to travel within slots 31 formed longitudinally within arms 32, which embrace the arms 28 and which are spaced apart a sufficient distance to permit the said arms 28 and the head 27 to work between the arms 32. These slotted arms 32 extend from one end of a sleeve 33, which is feathered on the shaft 25, and has a head 34 from which radiate oppositely extending trunnions 35 carrying anti-friction rollers 36. A gear 37 is loosely mounted on shaft 25, said gear being of the same size as the gear 19 and meshing therewith. This gear is provided on one face with wings 38, curved transversely so as to lie concentric with shaft 25, the two wings being oppositely disposed and provided with inclined cam faces 39 on which the rollers 36 are designed to simultaneously travel. A spring 40 is arranged on the shaft 25 between the sleeve 33 and the head 27, and serves to hold the rollers 35 normally pressed toward the gear 37 and against the narrowest portions of the wings 38.

Parallel arms 41 engage the sleeve 33 and are pivotally connected to parallel links 42, which links are in turn pivotally connected to one arm 43 of a bell-crank lever 44. The members 41, links 42 and arm 43 form a parallelogram which permits the distance between the pivot of the bell-crank lever and the point of connection between sleeve 33 and members 41 to vary, but which necessitates simultaneous swinging movement of the members 41 and the arm 43. The other arm 45 of the bell-crank lever is connected by means of a link 46 with a lever 47 fulcrumed, as at 48, upon an auxiliary frame 49, which supports a dial 50. A toothed segment 51 is secured to lever 47 and is concentric with the pivot 48, said segment meshing with a gear 52 secured to a spindle 53 carrying an index 54. Dial 50 is provided with numerals or other characters for indicating the torque.

It will be understood that when the shaft 2 is rotated motion will be transmitted therefrom through gear 19 to gear 37, which, as heretofore stated, is loosely mounted on the shaft 25. This shaft is connected, by means of a belt or other flexible device, with the load and before said load will be driven the gear 37 will partly rotate so as to force the cam faces 39 back of the rollers 36, and thus shift the sleeve 33 against the action of the spring 40. When the resistance of the spring shall equal the resistance of the load the gear 37 and the shaft 25 will rotate together. The longitudinal movement of sleeve 33 upon the shaft 25 will result in the actuation of bell-crank lever 44 and this lever will pull on the lever 47 through link 46 and thus cause the segment 51 to actuate gear 52, and produce a corresponding movement of the index 54, which will coöperate with the numerals or other characters on the dial 50 to indicate the torque.

Journaled upon the frame 1 at one end thereof and extending at right angles to the shafts 2 and 25 is a shaft 55 on which is feathered a disk 56 carried by a sleeve 57. This sleeve is engaged by the forked end 58 of an arm 59, which is parallel with lever 47 and is connected to it by parallel links 60, forming a parallelogram, so that the arm 59 and lever 47 are prevented from swinging independently of each other, but are permitted to shift longitudinally with relation to each other. The disk 56 normally bears upon the center of the concave disk 22, and the two disks are held in friction contact by the springs 23.

A centrifugal governor 61 is mounted on the shaft 55 and the sliding sleeve 62 thereof engages the hooked end 63 of an arm 64 secured to and radiating from a gear 65 mounted to rotate within an auxiliary frame 66. A dial 67 is carried by this frame 66 and has an index 68 movable with a spindle 69 having a gear 70 which meshes with the gear 65. A cam 71 is mounted on and rotates with the spindle 69 and has a groove in the periphery thereof in which is secured one end of a chain or other flexible element 72 carrying a weight 73. This weight serves to hold the index 68, arm 64 and governor 61 normally in predetermined position, the weight also serving to shift the governor toward its normal position whenever the speed of rotation of the shaft 55 slackens. The dial 67 has numerals or other characters thereon for indicating generated horse power.

As heretofore stated, the shaft 2 and the disk 22 rotate together and the disk 56 normally rests at the center of disk 22 and is not therefore rotated under normal conditions. When the meter is subjected to the resistance of a load the torque-indicating mechanism is actuated in the manner hereinbefore described, and, obviously, as soon as lever 47 is shifted, a corresponding movement of arm 59 is produced, so that sleeve 57 is thus caused to slide along the shaft 55, the amount of movement of said sleeve being in proportion to the torque. Moreover the speed of rotation of the disk 56 will increase in proportion to the movement of said disk along shaft 55, and the necessary multiplication of the torque by the speed for indicating horse power is thus obtained. The rotation of the shaft 55 will of course cause the governor 61 to shift and actuate the arm 64 which will in turn operate gears 65 and 70 and cause the index 68 to move over the dial 67 and indicate the horse power which is generated.

In order that the amount of horse power consumed during the operation of the machine may be accurately indicated a register such as indicated in Fig. 8 is provided. Shaft 55 is provided with a worm gear 74, designed to actuate a gear 75 arranged on a shaft 76 projecting into a housing 77. Another worm 78 is arranged on shaft 76 and drives a gear 79, one face of which constitutes a dial on which are arranged numerals preferably ranging from 1 to 9. Dials 80 and 81 are also arranged within the housing 77, the dial 80 being provided with radial fingers 82 designed to be successively engaged by a pin 83 outstanding from the gear 79. Fingers 84 also radiate from the dial 81 and are designed to be successively engaged by a pin 85 extending from one face of the dial 80. It will be seen therefore that the amount of horse power consumed will be accurately indicated by these dials.

The meter herein described may be used in various ways, and is intended, primarily, to be placed between the power and the load, so that the generated horse power and the amount of horse power consumed can be readily determined at all times.

The meter may be made in various sizes for use in connection with machinery of different kinds. It is to be understood also that various changes may be made in the construction and arrangement of the parts without departing from the spirit or sacrificing the advantages of the invention.

What is claimed is:—

1. In a meter of the class described the combination with variable power mechanism including contacting friction disks, one of said disks being normally inactive; of power mechanism for rotating the other disk, torque-indicating mechanism actuated by the said power mechanism, means operated by the torque-indicating mechanism, for shifting the normally inactive disk upon the face of the disk of the power mechanism in proportion to the developed torque, and separate means operated by the shifted disk for indicating power at the time of observation, and the total energy respectively.

2. In a meter of the class described the combination with variable power gearing including contacting friction disks, one of said disks being normally inactive; of power mechanism for actuating the other disk, torque-mechanism operated by the said power mechanism, means operated by the torque mechanism for shifting the normally inactive disk upon the face of the revoluble disk in proportion to the developed torque, and an indicator operated by the shiftable disk and including a centrifugal governor, a rocking element actuated thereby, an index, and gearing interposed between the index and the rocking element for transmitting motion to said index.

3. A meter including driving mechanism, torque-indicating mechanism, an indicator for disclosing horse-power at the time of observation, connections between the said mechanisms for actuating said indicator, an indicator for disclosing total energy, and means operated by said connections for actuating said last mentioned indicator.

4. In a dynamometer of the class described variable power gearing comprising a driving element, a normally inactive driven element, torque-operated means for shifting the driven element into operative relation to the driving element, and means operated by the driven element for indicating horse-power at the time of observation, and total energy-indicating means operated by said driven element.

5. In a dynamometer of the class described torque-indicating mechanism comprising a shaft for connection with a load, a power-actuated cam loosely mounted on the shaft and including oppositely disposed arcuate wings having inclined bearing faces, parallel arms secured to and revoluble with the shaft, a sleeve feathered upon the shaft, arms upon the sleeve and slidably engaging the first mentioned arms, trunnions radiating from the sleeve, a spring upon the shaft and bearing against the sleeve to hold the trunnions normally in contact with the inclined faces of the cam wings, a torque-indicator, and means for transmitting motion to said indicator from the sleeve.

In testimony that I claim the foregoing as my own, I have hereto affixed my signature in the presence of two witnesses.

WILLIAM E. BURT.

Witnesses:
 ROBERT E. TRAPPE,
 ERNEST JAHN.